United States Patent
Ashikaga (12) 
(10) Patent No.: US 6,215,513 B1
(45) Date of Patent: Apr. 10, 2001

(54) PULSE GENERATION APPARATUS AND IMAGE RECORDING APPARATUS

(75) Inventor: Hideaki Ashikaga, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/389,601

(22) Filed: Sep. 3, 1999

(30) Foreign Application Priority Data

Oct. 16, 1998 (JP) .................................................. 10-295170

(51) Int. Cl.$^7$ ........................................................ B41J 2/47
(52) U.S. Cl. ........................... 347/252; 347/237; 347/247
(58) Field of Search ................................... 347/131, 235, 347/237, 239, 240, 250, 251, 252, 255, 247; 345/204; 395/551, 552, 553, 555, 557

(56) References Cited

U.S. PATENT DOCUMENTS 5,250,939 * 10/1993 Takanashi et al. ..................... 345/204
5,760,811 * 6/1998 Seto et al. ............................. 347/131

FOREIGN PATENT DOCUMENTS

| 1-138809 | 5/1989 | (JP) . |
| 4-223667 | 8/1992 | (JP) . |
| 5-91274 | 4/1993 | (JP) . |
| 5-96780 | 4/1993 | (JP) . |
| 8-146328 | 6/1996 | (JP) . |

\* cited by examiner

*Primary Examiner*—N. Le
*Assistant Examiner*—Hai C. Pham
(74) *Attorney, Agent, or Firm*—Oliff & Berridge, PLC (57) ABSTRACT

The present invention relates to a pulse generation apparatus for generating a pulse signal having a pulse width controlled, and a pulse signal having a pulse width controlled with high precision is generated by a circuit suitable for conversion into LSI. The pulse generation apparatus comprises: a polyphase clock generating unit for generating polyphase clocks having different phases; a clock selecting unit for selecting one clock from among polyphase clocks on the basis of a pulse width indicating signal; a counting unit for counting clocks selected to output a pulse end signal at timing at which a counted value based on the pulse width indicating signal has been reached; a pulse output unit for starting the generation of a pulse signal on the basis of a pulse generation trigger signal to terminate the generation of the pulse signal on the basis of a pulse end signal; and a delay unit for delaying a pulse generation trigger signal by an amount of delay based on the pulse width indicating signal to thereby generate a count starting signal for instructing to start the counting of clocks in the counting unit.

7 Claims, 10 Drawing Sheets

| INPUT (DECIMAL) | | OUTPUT (HEXADECIMAL) PULSE WIDTH INDICATING SIGNAL |
|---|---|---|
| LIGHT-EMITTING ELEMENT ADDRESS SIGNAL | MODULATION DATA | |
| 1 | 0 | 00 |
| 1 | 1 | 20 |
| 1 | 2 | 40 |
| 1 | 3 | 60 |
| 1 | 4 | 80 |
| 1 | 5 | A0 |
| 1 | 6 | C0 |
| 1 | 7 | E0 |
| 2 | 0 | 00 |
| 2 | 1 | 1F |
| 2 | 2 | 3E |
| 2 | 3 | 5E |
| 2 | 4 | 7D |
| 2 | 5 | 9C |
| 2 | 6 | BB |
| 2 | 7 | DB |
| ⋮ | ⋮ | ⋮ |
| k | 0 | 00 |
| k | 1 | 22 |
| k | 2 | 44 |
| k | 3 | 65 |
| k | 4 | 87 |
| k | 5 | AB |
| k | 6 | CD |
| k | 7 | EF |

FIG. 7

(a) TRANSFER CLOCK
(b) MODULATION DATA
(c) SHIFT ENABLE SIGNAL
(d) OUTPUT FROM OUTGOING ELEMENT ADDRESS GENERATING UNIT 6
(e) OUTPUT FROM PULSE WIDTH INDICATING UNIT 16
(f) OUTPUT FROM FIRST STAGE OF SHIFT REGISTER 18
(g) OUTPUT FROM k-TH STAGE OF SHIFT REGISTER 18
(h) LATCH SIGNAL
(i) OUTPUT FROM LATCH UNIT (PULSE WIDTH INDICATING SIGNAL)
(j) PULSE GENERATION TRIGGER SIGNAL
(k) PULSE GENERATION TRIGGER SIGNAL (OUTPUT FROM DELAY UNIT 17-1)
(l) CLOCK WITH AN OPTIMUM PHASE (OUTPUT FROM CLOCK SELECTING UNIT 9-1)
(m) COUNTER VALUE (VALUE OF COUNTING UNIT 10-1)
(n) PULSE SIGNAL (OUTPUT FROM PULSE OUTPUT UNIT 11-1)

| LIGHT-EMITTING ELEMENT WHOSE EXPOSURE IS STABILIZED AND MODULATION DATA | | PSEUDO MODULATION DATA TRAIN |
|---|---|---|
| LIGHT-EMITTING ELEMENT NO. | MODULATION DATA | |
| 1 | 1 | 1, 0, 0, ···, 0, 0 |
| 1 | 2 | 2, 0, 0, ···, 0, 0 |
| 1 | 3 | 3, 0, 0, ···, 0, 0 |
| 1 | 4 | 4, 0, 0, ···, 0, 0 |
| 1 | 5 | 5, 0, 0, ···, 0, 0 |
| 1 | 6 | 6, 0, 0, ···, 0, 0 |
| 1 | 7 | 7, 0, 0, ···, 0, 0 |
| 2 | 1 | 0, 1, 0, ···, 0, 0 |
| 2 | 2 | 0, 2, 0, ···, 0, 0 |
| 2 | 3 | 0, 3, 0, ···, 0, 0 |
| 2 | 4 | 0, 4, 0, ···, 0, 0 |
| 2 | 5 | 0, 5, 0, ···, 0, 0 |
| 2 | 6 | 0, 6, 0, ···, 0, 0 |
| 2 | 7 | 0, 7, 0, ···, 0, 0 |
| ⋮ | ⋮ | ⋮ |
| k | 1 | 0, 0, 0, ···, 0, 1 |
| k | 2 | 0, 0, 0, ···, 0, 2 |
| k | 3 | 0, 0, 0, ···, 0, 3 |
| k | 4 | 0, 0, 0, ···, 0, 4 |
| k | 5 | 0, 0, 0, ···, 0, 5 |
| k | 6 | 0, 0, 0, ···, 0, 6 |
| k | 7 | 0, 0, 0, ···, 0, 7 |

FIG. 10

PULSE GENERATION APPARATUS AND IMAGE RECORDING APPARATUS

BACKGROUND OF THE INVENTION

1. Detailed Description of the Invention

The present invention relates to a pulse generation apparatus for generating a pulse signal having pulse width controlled, and an image recording apparatus for recording an image on an image recording medium by adopting the pulse generation apparatus.

2. Description of the Related Art

In order to record a high-quality gray-scale image, it is necessary to accurately form dots having a predetermined exposure at a predetermined position. Further, by handling a plurality of dots as one half tone cell, it is possible to record a beautiful image without unevenness by increasing a number of gradation levels.

In an image recording apparatus using a light source comprising a multiplicity of light-emitting points arranged across the recording area, there is adopted a method of recording an image by appropriately repeating pulse light emitting in response to the image, and therefore, control factors for the exposure are the following three:

1. a pulse number
2. pulse width
3. pulse light-emitting intensity and such a conventional image recording apparatus has performed gradation depiction and exposure stabilization by using these three control factors.

When, for example, the pulse number is adopted as a control factor, a number of times for an optical pulse irradiated per predetermined area will be increased or decreased. The predetermined area here often means, when a square having the width of a scanning line as the length of one side is defined as one dot, the area of this one dot normally. For example, in a system designed so that the optical pulse can be generated four times while the beam irradiation position moves by an amount corresponding to one dot, the exposure can be adjusted in four stages.

Also, when the pulse width is adopted as a control factor, the width of the optical pulse will be increased or decreased, and actually the width of the driving pulse for the electric circuit is to be adjusted. For example, in a system designed so that the width of the optical pulse can be increased or decreased in four stages, the exposure can be adjusted in four stages.

Also, when the pulse light-emitting intensity is adopted as a control factor, the intensity of the optical pulse will be increased or decreased to adjust the current amplitude or voltage amplitude of a driving pulse in the circuit. In a system designed so that the intensity of the optical pulse can be increased or decreased in four stages, the exposure can be adjusted in four stages.

As an example of an image recording apparatus having a light source comprising a multiplicity of light-emitting points arranged across the recording area, a printer (hereinafter called "LED printer") using a LED print head will be taken up for explanation. The apparatus which is popularly used currently is the one having resolution of 600 spi (Scan Per Inch), and when the process rate is set to 120 mm/sec, and the main scanning width is set to 300 mm (number of light-emitting elements is about 7,000 pieces), each control factor often adjusts so that the pulse number has about two stages, the pulse width has about 16 stages, and the pulse light-emitting intensity has about 16 stages because of constraints of the driving LSI. Each control factor has few control steps like this. This is because a multiplicity of light-emitting points are caused to pulse-emit light at the same time, the shift register for transferring modulation data, the latch unit, the current or voltage control circuit for controlling the exposure and the pulse width control circuit are required in the same number as at least a number of the light-emitting elements which are caused to light once, and are subject to constraints in respects of the circuit area, that is, the chip area of the driving LSI and power consumption.

Next, citing an example in which gradation depiction is performed while the exposure is being stabilized using these control factors, when gradation using pulse number control is set to two steps, gradation using pulse width control is set to 16 steps and the size of a half-tone cell is set to four dots (2 dots each long and wide), the number of gradation steps which can be expressed becomes 2×16×4=128, and the stabilized exposure is to be performed by the remaining control factors (16 stages of pulse light-emitting intensity). Normally, variations in the light-emitting amount occur about ±20% with the LED print head, and therefore, one stage for adjusting the pulse light-emitting intensity is 2.5% even if an adjusting range, in which there exist 16 stages of pulse light-emitting intensity, is skillfully set, and only rough adjustment can be performed.

In order to improve such deficiency of the number of gradation depiction and the exposure stabilization precision, it is necessary to finely adjust those three control factors.

(1) In the pulse number, it takes time to transfer modulation data, and the transfer circuit for the modulation data must be made faster. To the end, the driving LSI must be made faster, the LSI fabrication process must be replaced with a process corresponding to the higher rate, and a significant increase in cost is demanded.

(2) In the pulse light-emitting intensity, it is necessary to increase the resolution of the D/A converter for controlling the driving current or driving voltage, and it is necessary to further make the analog circuit larger, which accounts for the greater part of the area and the power consumption of the driving LSI.

(3) In the pulse width, the counter circuit for controlling the pulse width must be made faster. To the end, it is necessary to replace the fabrication process for the driving LSI with a process corresponding to the higher rate, and a significant increase in cost is demanded. Also, as regards a method of finely controlling the pulse width without the aid of any high-speed clock, by combining a delay element having a finer amount of delay than the clock period with the counter circuit for use, there have been proposed several ones, but all of them have problems, and cannot be used.

Under the above-described circumstances, it is not easy to further divide the control step.

As regards a conventional method (above-described (3)) for finely controlling the pulse width by the delay element without the aid of any high-speed clock which has been proposed, the problems will be described in detail.

Such a high resolution pulse width control method has been proposed in detail in, for example, Japanese Published Unexamined Patent Application Nos. 1-138809, 4-223667, 5-091274, 5-096780 and 8-146328.

These can be roughly divided into two, and the first of them (for the Japanese Published Unexamined Patent Application Nos. 1-138809, 4-223667, 5-091274, and 8-146328, see the official gazettes) is constructed such that a clock of a comparatively low frequency is counted by a counter to generate a pulse, this pulse is delayed by a desired time period by a delay-time variable type delay unit, and there-after the original pulse and logical OR or logical product are taken. The pulse width control resolution of this method is determined by the delay time control step of the delay unit.

Considering, for example, a case where a 20 MHz clock is counted by a number indicated by high-order four bits of a pulse width control signal to generate a pulse, and this pulse is delayed by a time period indicated by the low-order four bits to take logical OR of the both finally, the delay unit is constructed so that its control step becomes about 3.1 ns. Thus, the same pulse width control can be performed as a pulse created by counting a 320 MHz (period=about 3.1 ns) clock.

In order to ensure the linearity during carrying (for example, 5 F and 60 in hexadecimal) of the pulse width control signal, it is necessary to set the control step of the delay time accurately to 3.1 ns in the delay unit used here. For example, when the control step changes from 3.1 ns to 3.2 ns, each step such as 50 to 5 F and 60 to 6 F is fixed at 3.2 ns, but 2.0 ns is reached between 5 F and 60, between 6 F and 70, and the like, and the linearity is lost. In order to complement this defect, an expensive high-precision element is normally used for the delay unit in this method. Even in the case of converting this control circuit into an LSI, no high-precision delay element can be fabricated within the LSI, and therefore, it is necessary to externally add an expensive high-precision element for use.

Considering the application of this method to an image recording apparatus having a light source comprising a multiplicity of light-emitting points arranged across the recording area, it becomes necessary to provide high-precision delay elements at least in the same number as the number of light-emitting elements which are lighted at the same time. Moreover, those high-precision delay elements must be externally provided for the driving LSI, and it is actually impossible to construct the driving circuit by this method. Next, the description will be made of the second high resolution pulse width control method (see Japanese Published Unexamined Patent Application No. 5-096780). Polyphase clocks, which are delayed a fixed time period at a time, are created from clocks with a comparatively low frequency by the delay unit, and one clock with an optimum phase is selected from these polyphase clocks for counting. The generation of a pulse signal is started at predetermined timing, and the generation of the pulse signal is stopped according to an instruction from this counter, whereby the pulse width can be finely controlled in response to the phase of the clock.

Even in this method, the pulse width control resolution is determined by phase differences of the polyphase clocks. In the case of such structure that after 16-phase polyphase clocks are created from, for example, 20 MHz clocks, clocks having a phase indicated by the low order four bits of the pulse width control signal are selected, and the generation of the pulse signal is stopped at timing at which this clock is counted in a number indicated by the high order four bits, the same pulse width control as a pulse created by counting a 320 MHz clock can be performed in principle if the phase difference of polyphase clocks is about 3.1 ns.

Actually, however, a case where timing, at which the counter starts counting, is close to the phase of a clock selected frequently occurs, and at this time, there is a critical defect that a malfunction in which the counter counts or does not count the first clock is caused.

This method is the same as the first method in that in order to ensure the linearity of the pulse width control, it is necessary to use an expensive high-precision delay element.

As described above, the conventional method for finely controlling the pulse width by the delay element without the aid of any high-speed clock which has been proposed, cannot be adopted for the LSI for simultaneously driving a multiplicity of elements.

SUMMARY OF THE INVENTION

The present invention has been achieved in order to solve the above-described problems, and is aimed to provide a pulse generation apparatus for generating a pulse signal having a pulse width controlled with high precision by a circuit suitable for conversion into LSI, and an image recording apparatus capable of recording a high-image quality image using the pulse generation apparatus by simultaneously improving the gradation depiction number and the exposure stability.

The above-described object can be attained by a pulse generation apparatus according to the present invention that includes a polyphase clock generating unit for generating polyphase clocks having an equal frequency and different phases on the basis of a predetermined reference clock, a clock selecting unit for selecting one clock from among polyphase clocks outputted from the polyphase clock generating unit on the basis of a predetermined pulse width indicating signal for indicating a pulse width, and a counting unit for counting clocks selected by the clock selecting unit to output a pulse end signal at timing at which a counted value determined on the basis of the pulse width indicating signal is reached. The apparatus also includes a pulse output unit for starting generation of a pulse signal on the basis of a pulse generation trigger signal for instructing to start generation of a pulse to terminate the generation of the pulse signal on the basis of a pulse end signal outputted from the counting unit, and a delay unit for generating a count starting signal for instructing to start the counting of clocks in the counting unit by delaying the pulse generation trigger signal by an amount of delay selected on the basis of the pulse width indicating signal.

The above-described object can be attained by an image recording apparatus according to the present invention, having light-emitting element array having a plurality of light-emitting elements arranged, and a light-emitting control portion for controlling light emitting by a plurality of light-emitting elements which constitute the light-emitting element array in response to image information, for recording an image consisting of a latent image or a toner image on a predetermined image recording medium by means of light emitting by a plurality of light-emitting elements which constitute the light-emitting element array.

The above-described light-emitting control portion has a light-emitting pulse width control portion provided correspondingly to each of the plurality of light-emitting elements which constitute the light-emitting element array, for controlling the light-emitting pulse widths of the corresponding light-emitting elements, and a polyphase clock generating portion for generating polyphase clocks having an equal frequency and different phases which is shared by a plurality of light-emitting pulse width control portions on the basis of a predetermined reference clock.

Each of the above-described light-emitting pulse width control portions has a clock selecting unit for selecting one clock from among polyphase clocks outputted from the polyphase clock generating portion on the basis of a predetermined pulse width indicating signal for indicating the pulse width, a counting unit for counting clocks selected by a clock selecting unit to output a pulse end signal at timing at which a counted value determined on the basis of the pulse width indicating signal is reached, a pulse output unit for starting generation of a pulse signal on the basis of a pulse generation trigger signal for instructing to start the generation of a pulse to terminate the generation of the pulse signal on the basis of a pulse end signal outputted from the counting unit, and a delay unit for delaying a pulse generation trigger signal by an amount of delay selected on the basis of the pulse width indicating signal to thereby generate a count starting signal for instructing to start the counting of clocks in the counting unit.

DETAILED DESCRIPTION OF PREFERRED EMBODIMENTS

Hereinafter, with reference to embodiments shown in the drawings, a description will be made of the present invention.

Figure 1:
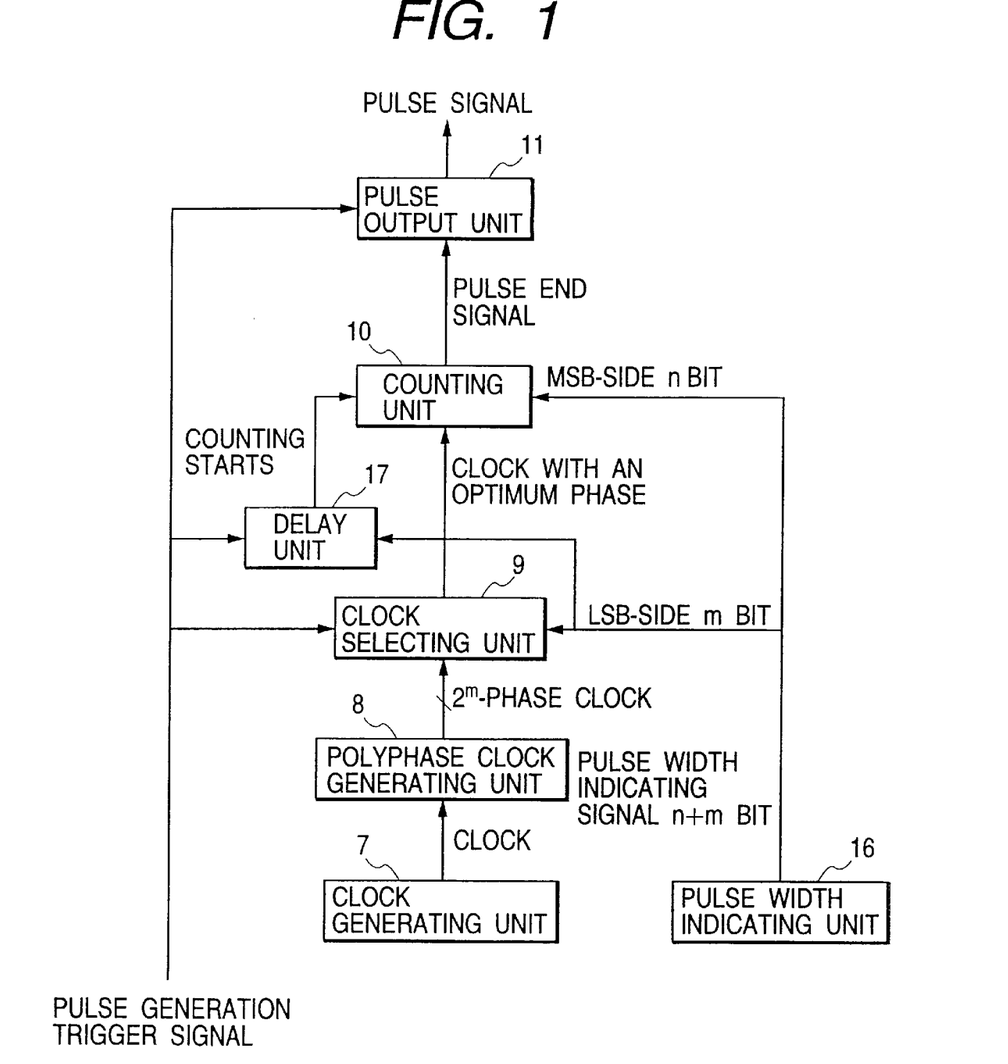
FIG. 1 is a circuit block diagram showing a pulse generation apparatus according to a first embodiment of the present invention.
Figure 2:
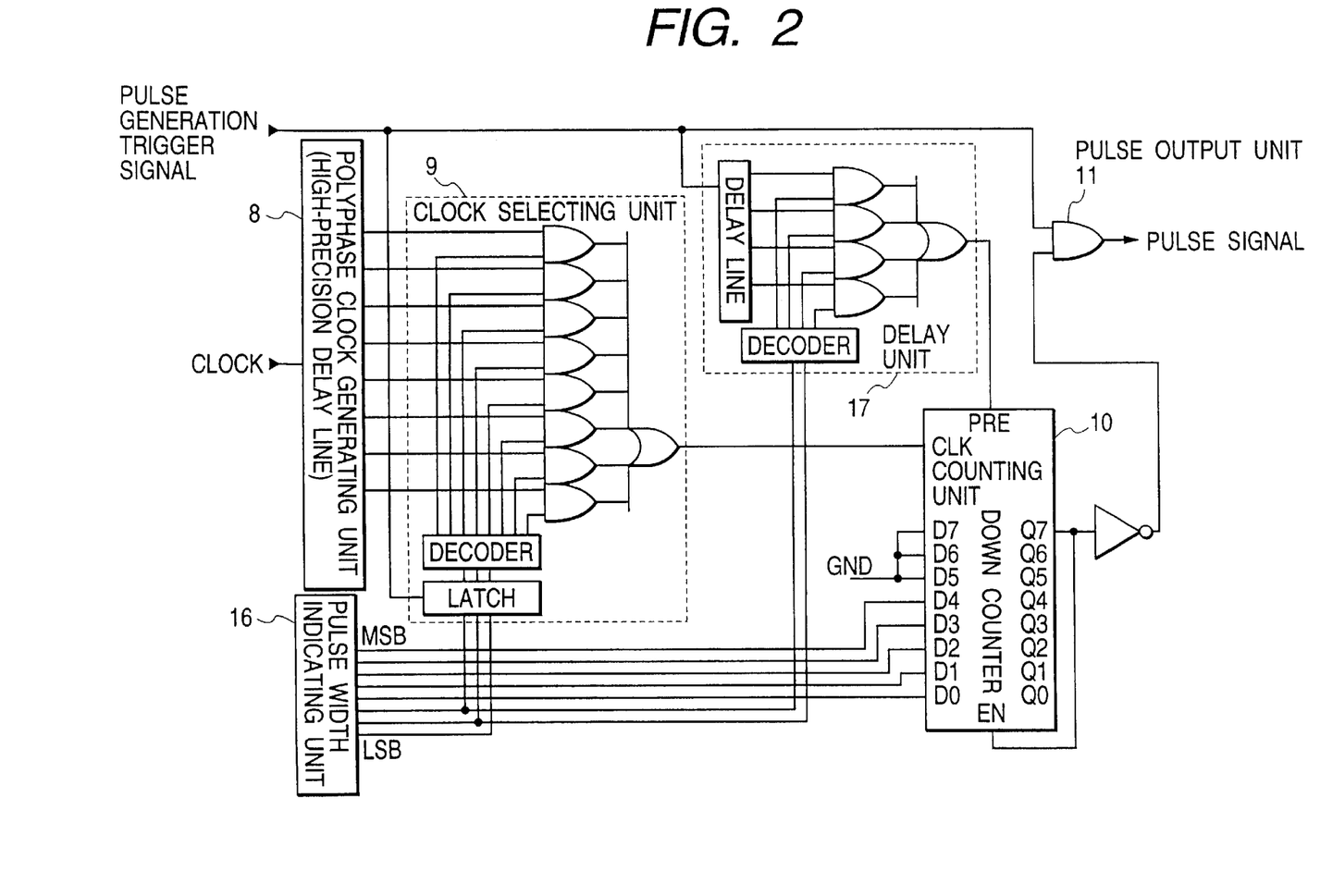
FIG. 2 is a view showing an example of a circuit for implementing the structure of the pulse generation apparatus shown in FIG. 1.

FIG. 1 is a circuit block diagram showing a pulse generation apparatus according to a first embodiment of the present invention, and FIG. 2 is a view showing an example of a circuit for implementing the structure of the pulse generation apparatus shown in FIG. 1.

The pulse generation apparatus shown in FIG. 1 comprises a clock generating unit 7, a polyphase clock generating unit 8, a clock selecting unit 9, a counting unit 10, a pulse output unit 11, a pulse width indicating unit 16, and a delay unit 17.

The clock generating unit 7 stably generates a predetermined frequency of clocks. For this clock generating unit 7, an oscillation circuit such as a crystal oscillator is used, and there is no need for the provision thereof for the exclusive use especially in this circuit, but any clock used for another circuit may be diverted to this purpose so long as it coincides in specification such as frequency. For this reason, in FIG. 2, this clock generating unit 7 is not shown, but is constructed such that it is inputted from another circuit.

Figure 3:
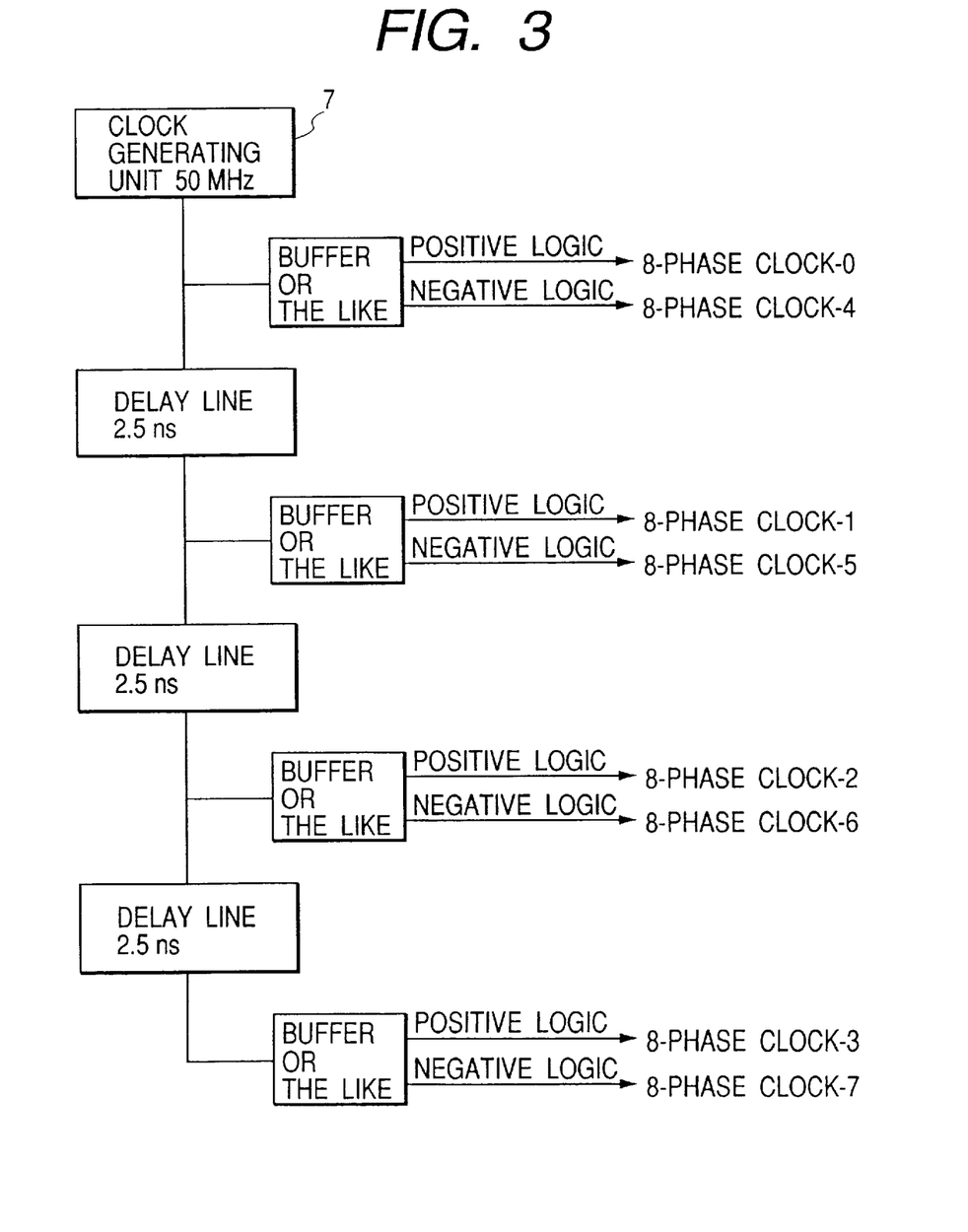
FIG. 3 is a block diagram showing a structural example of a polyphase clock generating unit.

The polyphase clock generating unit 8 is used to convert clocks generated by the clock generating unit 7 into polyphase clocks having an equal frequency and different phases, and a multi-stage delay line having a plurality of terminals for outputting signals delayed a predetermined time period at a time is used, or a delay line having one output terminal is used by cascade connection. As described also in the conventional example, the linearity of the pulse width control is lost when the precision in delay time is low, and therefore, an element with few variations in delay time will be used even if somewhat expensive. If a buffer with both output of positive logic and negative logic or the like could be used, expensive delay lines could be reduced by constructing, for example, as shown in FIG. 3. FIG. 3 will be described later. In FIG. 2, there is shown an example in which a high-precision multi-stage delay line is adopted for this polyphase clock generating unit 8.

The clock selecting unit 9 is used to select an optimum clock from among polyphase clocks generated by the polyphase clock generating unit 8, can be constituted by an element called "selector" for selecting one signal from a plurality of signals for outputting, and can be easily constituted by a decoder and a gate. FIG. 2 shows an example of constitution in which a decoder and a gate are used for this clock selecting unit 9.

An optimum clock is selected by this clock selecting unit 9 at timing at which a pulse generation trigger signal is inputted, and in accordance with a pulse width indicating signal outputted from the pulse width indicating unit 16. Concretely, of pulse width indicating signal n+m bits from the pulse width indicating unit 16, the selection is performed in such a manner that when, referring to a low order m bit, its value is 0, a zeroth phase having the least phase lag is selected, when the value is 1, the first phase is selected, and ... However, there are also cases where, depending upon an amount of delay in signal transfer of elements constituting the circuit, a more optimum clock can be selected by selecting in slightly deviated relationship in such a manner that when the low order m bit of the pulse width indicating signal is 0, the first phase is selected, when it is 1, the second phase is selected, and so on. Studying is required every time the circuit design is made.

The pulse width indicating unit 16 outputs a signal for indicating a pulse width to the clock selecting unit 9, the delay unit 17 and the counting unit 10, and normally determines a pulse width in response to modulation data indicating light and shade of an image to output a pulse width indicating signal representing the pulse width thus determined. Also, if the exposure deviates from the standard, the pulse width is finely adjusted to make the exposure uniform. As regards this pulse width indicating unit 16, there area case where it is constituted by a fixed storage unit such as a ROM so that modulation data or a signal indicating the magnitude of an exposure is inputted into its address terminal, and a case where it is constituted by a variable storage unit such as a RAM so that modulation data is inputted into the address terminal and the storage data in the storage unit is rewritten (increased or decreased) by a signal indicating the magnitude of exposure. FIG. 2 shows a case where the pulse width indicating signal has eight bits, MSB-side five bits are outputted to the counting unit 10, and LSB-side three bits are outputted to the clock selecting unit 9 and the delay unit 17.

The counting unit 10 counts clocks selected by the clock selecting unit 9, outputs a pulse end signal to the pulse output unit 11 to terminate the pulse output at the termination of the counting, and is constituted by a counter IC. An initial value to be counted is MSB-side n bit of a pulse width indicating signal outputted by the pulse width indicating unit 16, and timing for count starting is indicated by a pulse generation trigger signal delayed by a predetermined time by the delay unit 17. In FIG. 2, an 8-bit down counter is used, and MSB-side five bits of pulse width indicating signal are inputted to low order side five bits D4 to D0 of an initial value input terminal, and LOW level signals are inputted into all high-order side three bits D7 to D5. On the other hand, the structure is arranged such that a count starting signal from the delay unit 17 is inputted to a preset terminal, and the count starting signal controls both presetting operation for the initial value and count starting operation. Further, a most significant bit Q7 for outputting a count value is inputted to an enable terminal EN of the counter, and the counter is arranged to operate only while this is HIGH. Also, this most significant bit Q7 is outputted to the pulse output unit 11 via an inverter. Thus, the counting unit 10 reads the initial value while the count starting signal from the delay unit 17 is LOW, starts counting of the clock at rise timing at which the signal changes to HIGH, and can instruct the pulse output unit 11 to terminate the pulse output at timing at which the count value changes from 00 to FF.

The delay unit 17 delays the pulse generation trigger signal by a predetermined time, and outputs to the counting unit 10 as a count starting signal. The delay time is controlled so that it becomes a delay time corresponding to a clock selected by the clock selecting unit 9 on the basis of LSB-side m bit of a pulse width indicating signal outputted from the pulse width indicating unit 16. This is because count starting by the counting unit 10 is caused to be always deviated from the rise of the clock selected by the clock selecting unit. For this delaying unit 17, there can also be used a commercially available variable-amount of delay type delay line, and it may also be constituted by a multi-stage delay line, a decoder and a gate circuit as shown in FIG. 2. Also, since the precision in the amount of delay may be low as shown below, it is possible to constitute it by cascade-connecting the gate circuit.

In this case, this delay unit 17 selects one amount of delay from among a plurality of amounts of delay which vary stepwise, and delays the pulse generation trigger signal by the amount of delay thus selected to thereby generate a count starting signal. A number of steps in the amount of delay in this delay unit 17 may be smaller than a number of clocks having different phases which constitute polyphase clocks to be outputted from the polyphase clock generation unit 8.

In the example of FIG. 2, the number of steps in the amount of delay has been set to half the number (8 pieces) of clocks of the polyphase clock, and it may be reduced to about ¼ depending upon the characteristic of the IC for use.

The pulse output unit 11 outputs a pulse signal during a period of time from a time at which it receives a pulse generation trigger signal to a time at which it receives a pulse end signal, and can normally be constituted by a simple gate circuit. Since, however, the contents of the structure are determined by the structure of the counting unit 10 in the previous portion, the logic of the pulse trigger signal and the like, it is necessary to change it accordingly. In the example of FIG. 2, since the pulse generation trigger signal uses negative logic, the pulse is caused to be generated from the rise, and the counting unit 10 has the structure described above, one AND gate will suffice for the pulse output unit.

FIG. 3 is a block diagram showing an example of structure of a polyphase clock generating unit.

As described already, the polyphase clock generating unit 8 can be constituted by using an expensive, high-precision multi-stage delay line, but if a buffer having output of both positive logic and negative logic or the like is used as shown in FIG. 3, it is combined with a low-priced delay line with one-stage output although high precision, whereby a desired polyphase clock can be fabricated. In FIG. 3, three one-stage delay lines (amount of delay 2.5 nS) are cascade-connected to the 50 MHz (20 nS period) clock generating unit, and a buffer of output of both positive logic and negative logic is connected to each signal. Then, the zeroth phase and fourth phase of an 8-phase clock are outputted from the buffer directly connected to the output from the clock generating unit 7, and signals delayed by 2.5 nS respectively, that is, the first phase and the fifth phase are outputted from the buffer which has passed through one of the delay lines. When the buffer passes through two or three delay lines, all 8-phase clocks can be created in a similar manner.

As a concrete structure of the present invention, many structures can be conceived in addition to the one shown in FIG. 2, and the structure of FIG. 2 has excellent advantages among others, as compared with others, that the clock selecting unit and the delay unit can be constituted by a simple logic circuit, and that the number of bits of the counter is made to have at least one bit more than the MSB-side n bit of the pulse width indicating signal (3 bits more in the case of FIG. 2) to thereby make the structure of the counter and the pulse output unit very simple.

Figure 4:
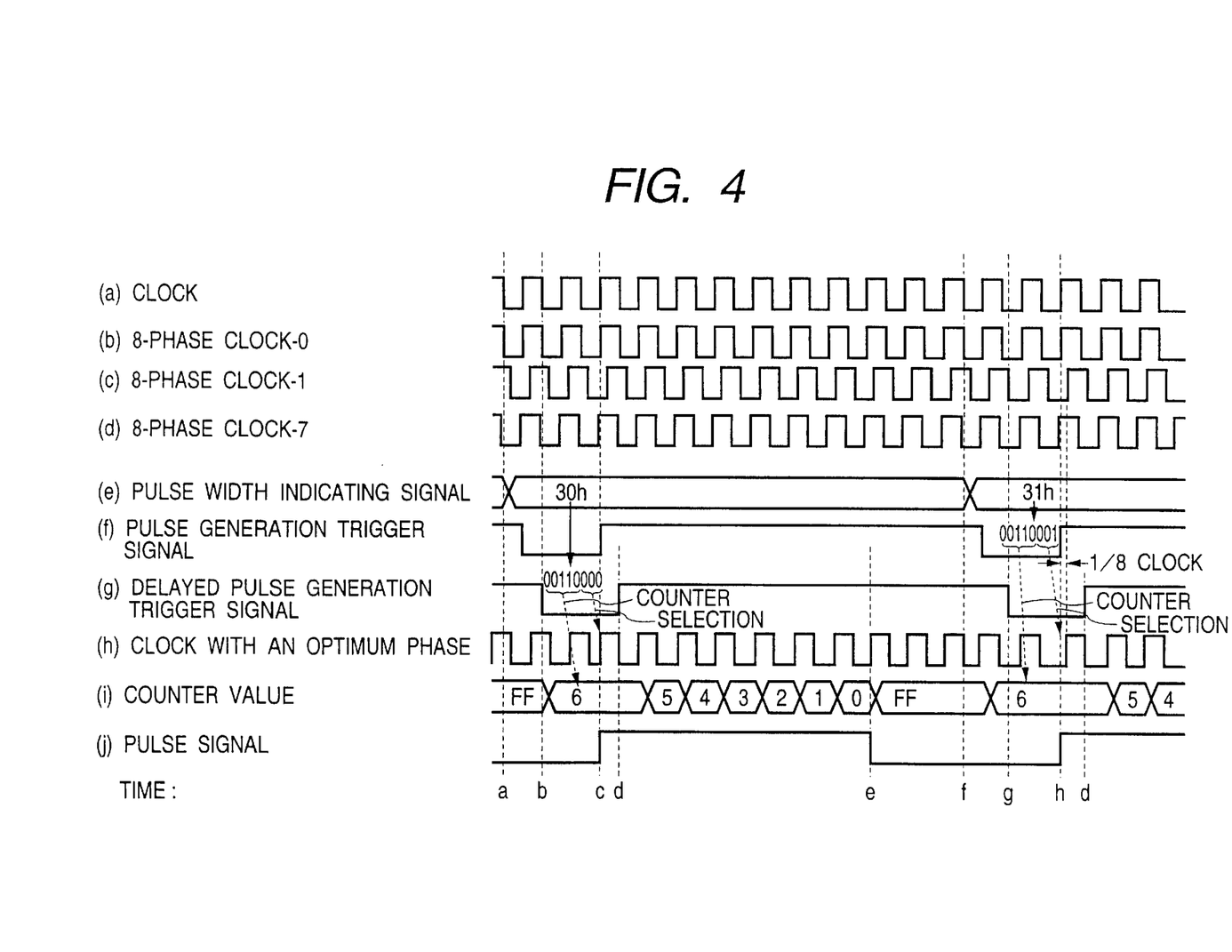
FIG. 4 is a timing chart showing the operation of the pulse generation apparatus.

Hereinafter, with reference to FIG. 4, a description will be made of the operation of the pulse generation apparatus. FIG. 4 is a timing chart showing the operation of the pulse generation apparatus. The operation in the circuit shown in FIG. 2 is shown here.

In FIG. 4, (a) designates a clock generated by the clock generating unit 7, and from this clock, the polyphase clock generating unit 8 creates polyphase clocks (8-phase clock-0 to clock-7 of (b), (c) . . . (d)) having different phases and an equal frequency. When a pulse generation trigger signal (f) is inputted, the clock selecting unit 9 selects a clock (h) having an optimum phase at the rise time c. At a preceding time a, the pulse width indicating unit updates the pulse width indicating signal (e) to a new value (30 in hexadecimal in FIG. 4), and the clock in the clock selecting unit 9 is selected in response to LSB-side three bits of a new pulse width indicating signal. On the other hand, a pulse generation trigger signal (f) is delayed by the delay unit 17 to become a delayed pulse generation trigger signal (g), which is also used as a count starting signal, and the initial value (6 in hexadecimal in FIG. 4) is loaded into the counting unit 10 during a period of time (between time b and time d) at a LOW level. Also, at rise time d of the pulse generation trigger signal (g) delayed, the counting unit 10 starts counting down. AS a result, the counter value shifts from FF to 06 at time b, to 05, 04, . . . by rise of clock on and after time d, and from 00 to FF at time e. Then, an enable terminal of the counting unit 10 becomes HIGH to terminate the counting operation. In this series of operations, the pulse output unit 11 ANDs the pulse generation trigger signal (f) and an invert signal (pulse end signal) of the counter value MSB, and therefore, the output becomes a pulse signal continuing from the rise time c of the pulse generation trigger signal to a time e at which the counter value shifts from 00 to FF.

In FIG. 4, the operation is as described above, and a case is considered where the pulse width indicating signal (e) changes from 30 to 31, 32, . . . At this time, since a clock to be selected changes from a 8-phase clock-0 (b) to clock-1 (c), clock-2, clock-3, . . . , timing, at which the counter value shifts to 6, 5, 4, . . . 0, FF, is delayed by a phase difference (⅛ clock in FIG. 3) of the clock selected at a time. Then, the rise time (time c) of the pulse generation trigger signal (f) does not change, but only time (time e), at which the counter value shifts from 00 to FF, changes by the phase difference of the clock at a time, and therefore, as a result, it can be seen that the pulse width can be controlled by resolution of the phase difference. In this respect, the operation when the pulse width indicating signal (e) is 31 is shown at time f to time i of FIG. 4.

Next, with reference to the drawings, a description will be made of a second embodiment of pulse generation apparatus according to the present invention.

Figure 5:
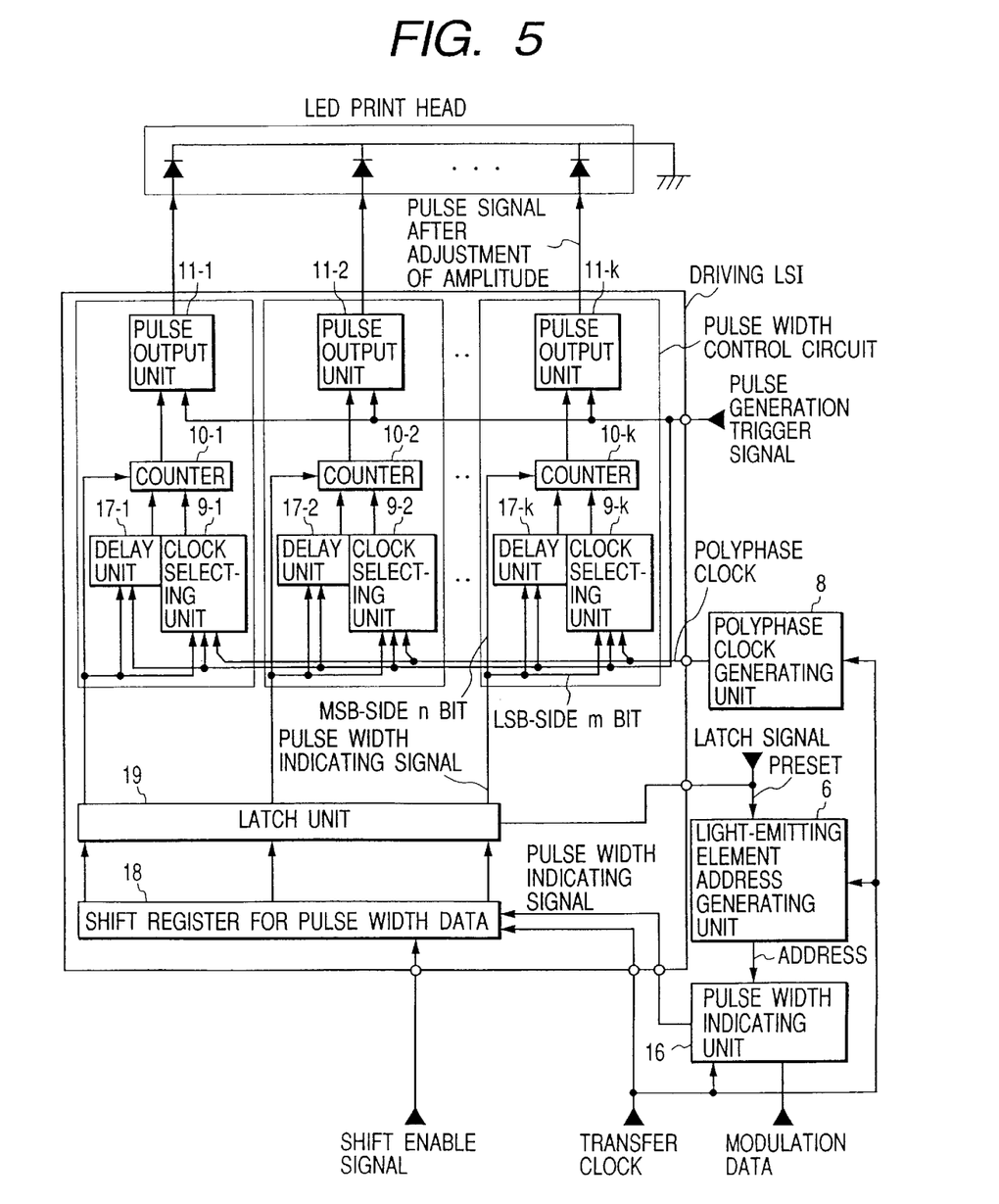
FIG. 5 is a block diagram showing the structure of a second embodiment of the pulse generation apparatus according to the present invention.

FIG. 5 is a block diagram showing the structure of a driving LSI for driving a light source comprising a multiplicity of light-emitting points arranged across the recording area, and a driver (a second embodiment of the pulse generation apparatus according to the present invention) constituted with the driving LSI being centered.

The driver shown in FIG. 5 comprises a clock generating unit (not shown), a polyphase clock generating unit 8, a pulse width indicating unit 16, a light-emitting element address generating unit 6, clock selecting units 9-1 to 9-k, counting units 10-1 to 10-k, pulse output units 11-1 to 11-k, delay units 17-1 to 17-k, a shift register 18 for pulse width data, and a latch unit 19.

In FIG. 5, the polyphase clock generating unit 8, the pulse width indicating unit 16, the clock selecting units 9-1 to 9-k, the counting units 10-1 to 10-k, the pulse output units 11-1 to 11-k, and the delay units 17-1 to 17-k are the same in structure and function as in the case of the first embodiment (see FIG. 1) described above. In the case of the second embodiment shown in FIG. 5, however, in order to drive a LED print head having k pieces of light-emitting points which emit light at the same time, one clock selecting unit, one counting unit, one pulse output unit and one delay unit are required for the respective light-emitting points. In contrast, one polyphase clock generating unit 8 is enough for the whole.

Since a plurality of light-emitting elements which the LED print head has are different in characteristic for each element, they differ in the optimum modulation pulse width even if they have the same modulation data. In FIG. 5, there is provided a light-emitting element address generating unit 6 in such a manner that the correspondence relation between the modulation data and an element for emitting light using the modulation data can be recognized. Therefore, the pulse width indicating unit 16 can output a pulse width indicating signal by viewing both the modulation data and the light-emitting element address, and a uniform exposure can be obtained even if there may be a difference in characteristic between the light-emitting elements. The light-emitting element address generating unit 8 is normally composed of logic IC such as the counter. In the example shown in FIG. 5, a transfer clock is connected to the clock terminal of the counter 8, a latch signal is connected to the preset terminal, and the structure is arranged such that the counter is preset every time the transfer to the shift registor 18 for pulse width data is terminated.

The pulse width indicating unit 16 is provided with a look-up table having a light-emitting element address and modulation data as input, and a pulse width indicating signal as output.

Figure 6:
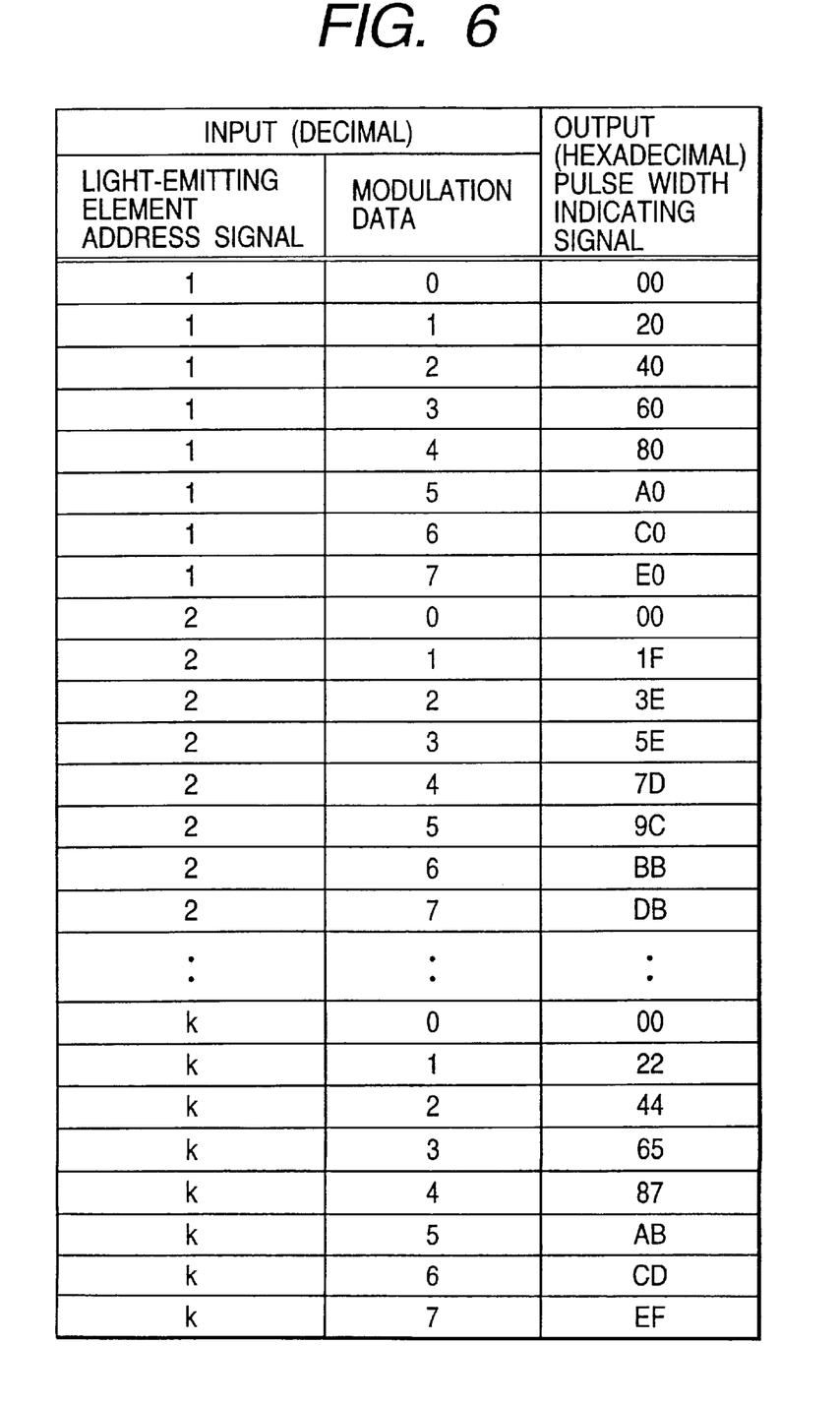
FIG. 6 is an example of a look-up table.

FIG. 6 is a view showing an example of the look-up table.

The example of FIG. 6 shows a case where there are k pieces of light-emitting elements and eight levels (3 bits) from 0 to 7 of modulation data, and is capable of expressing eight levels of gray including 0 level. Also, it is assumed that a light-emitting element 1 is an element having standard characteristic, an element 2 is an element having a slightly good light-emitting efficiency, and an element k is an element having a slightly inferior light-emitting efficiency. With the provision of such a look-up table, the pulse width indicating signal will be unanimously determined if a light-emitting element address and modulation data are given as input.

Also, in FIG. 5, the shift register 18 for pulse width data and the latch unit 19 are used to distribute pulse width indicating signals from the pulse width indicating unit 16 among a multiplicity (k pieces) of pulse width control circuits. The pulse width indicating signals are successively outputted from the pulse width indicating unit 16 in response to modulation data inputted in synchronism with the transfer clock and the output from the light-emitting element address generating unit 8. The shift register 18 for pulse width data is used to successively shift these pulse width indicating signals by the transfer clock and to output to the latch unit 19 as a parallel signal, and is constructed by a logical circuit such as a flip-flop. On the other hand, when a latch signal is inputted from another circuit (not shown) (for example, controller), the latch unit 19 accumulates parallel data outputted from the shift register 18 for pulse width data, continues to output the parallel data to the pulse width control circuit during a period of time until the latch signal is inputted, and is constructed by a logical circuit such as a flip-flop.

The second embodiment according to the present invention is constructed as described above, and hereinafter, with reference to FIG. 7, the description will be made of the operation.

Figure 7:
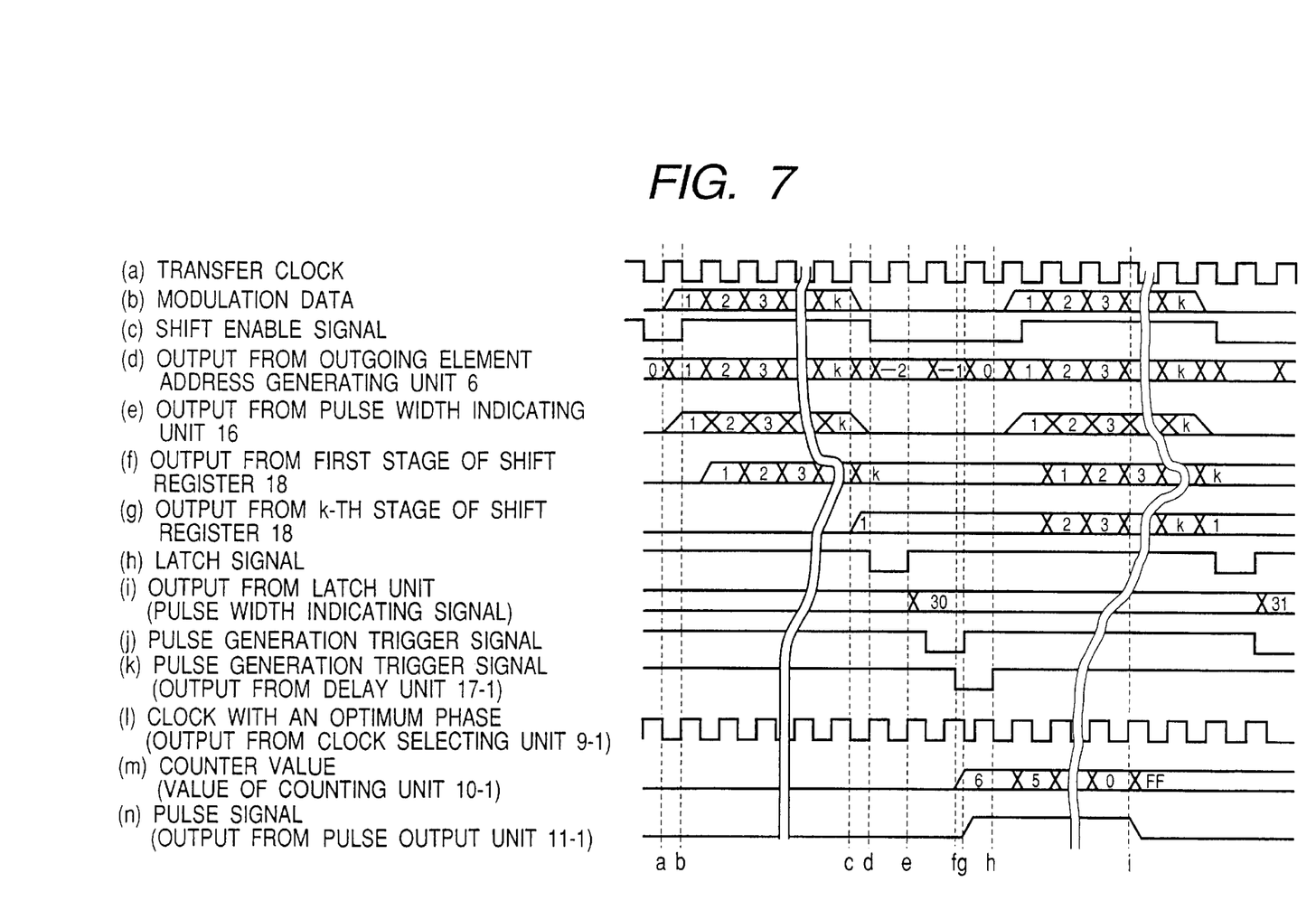
FIG. 7 is a timing chart showing the operation of the second embodiment.

FIG. 7 is a timing chart showing the operation of the second embodiment, and shows the timing in the structure of FIG. 5.

In FIG. 7, modulation data (b) is inputted from a controller (not shown) during a period of time between time and time c. This modulation data (b) is in synchronism with the transfer clock (a), and the sequence is a sequence of the first, second, third . . . , k-th data for light-emitting element (signals of FIG. 7 are indicated by numerals). Then, this modulation data (b) is converted to a pulse width indicating signal train (output (e) from the pulse width indicating unit 16) while referring to the output (d) from the light-emitting element address generating unit 6 (the numeral in a signal indicates the value of this signal) by the pulse width indicating unit 16, and is supplied to the shift register 18 for pulse width data in the order of the first, second, third, . . . , k-th. Also, during a period of time from time b to time d, a shift enable signal is inputted, and under this control, the shift register 18 for pulse width data starts a shift operation at time b, and terminates at time d after the shift operations k-times (a number of light-emitting elements of LED print head). The above-described operation stores k-th to the first data of the pulse width indicating signal train at the first stage to the k-th stage of the shift register 18 for pulse width data. This state is shown by the first stage output (f) of the shift register 18 and the k-th stage output (g) thereof in FIG. 7. The numeral in the signal indicates data corresponding to which light-emitting element.

Next, a latch signal (h) is inputted from a circuit such as a controller, and the pulse width indicating signal trains are collectively latched into the latch unit 19 from the shift register 18 for pulse width data at the rise time e. Thus, the respective pulse width indicating signals (latch unit output (i)) are outputted to the circuit at the latter stage.

When a pulse generation trigger signal (j) is inputted, high-order five bits (06 in hexadecimal) of the pulse width indicating signal (output (i) from latch unit, 30 is given in hexadecimal as an example) held by the latch unit 19 are loaded into the counting unit (counter value (m)) during a period of time in which the pulse generation trigger signal (k) delayed is active (from time f to time h). In parallel therewith, the clock selecting unit selects a clock with an optimum phase (clock (1) with an optimum phase) at the rise (time g) of the pulse generation trigger signal (j) in accordance with the low order three bits (0 min hexadecimal in FIG. 7) of the pulse width indicating signal held by the latch unit. The counting unit 10 starts counting of this clock selected at the rise (time h) of the pulse generation trigger signal (k) delayed. On the other hand, the pulse output unit 11 makes the output active to output the pulse during a period of time from a rise (time g) of the pulse generation trigger signal (j) to a time (i) at which the counter value changes from 00 to FF.

If the structure is arranged as shown in FIG. 5, it is possible to obtain a pulse signal which becomes active during a period of time from a rise of the pulse generation trigger signal to a time at which the counter value changes from 00 to FF. Therefore, if the pulse width indicating signal is changed, the time (time i), at which the counter value changes from 00 to FF, can be adjusted by resolution corresponding to the phase difference of the polyphase clock. Also, it is possible to set pulse width indicating signals having respectively different values to a multiplicity of pulse width control circuits by means of the shift register 18 for pulse width data and the latch unit 19, and it is also possible to change the pulse width indicating signal by changing the modulation data. Therefore, by supplying modulation data representing an image, each light-emitting point of the LED print head can be driven by an independent pulse width in response to the density of the image, and therefore, this can be applied to an apparatus for forming multi-tone images.

Also, with the provision of a light-emitting element address generating unit 8, it becomes possible to keep the correspondence between modulation data and an element for emitting light using the data, and if the pulse width indicating unit is constructed as described later by referring to FIG. 9, a uniform exposure can be obtained even if there is any difference in characteristic in the light-emitting elements.

Generally, in the case of driving a light source comprising a multiplicity of light-emitting points arranged across the recording area, the multiplicity of light-emitting points are simultaneously driven and therefore, the driving circuit is converted into LSI. However, in the conventional method for finely controlling the pulse width by the delay element without the aid of any high-speed clock which has been proposed, it has already been described that it is difficult to convert into LSI partly because one high-precision delay element is required for each of the pulse width control circuits, and partly because the high-precision delay element requires high power consumption and a large required area.

In contrast, according to the present embodiment, a high-precision delay element can be utilized in common in a plurality of pulse width control circuits, and at least one light source will suffice, and therefore, it is possible to convert into LSI. This high-precision delay element (incorporated in the polyphase clock generating unit 8 in FIG. 5) is provided outside of the LSI as shown in FIG. 5, and is supplied to the LSI.

With reference to the drawings, a description will be made of a third embodiment according to the present invention.

Figure 8A:
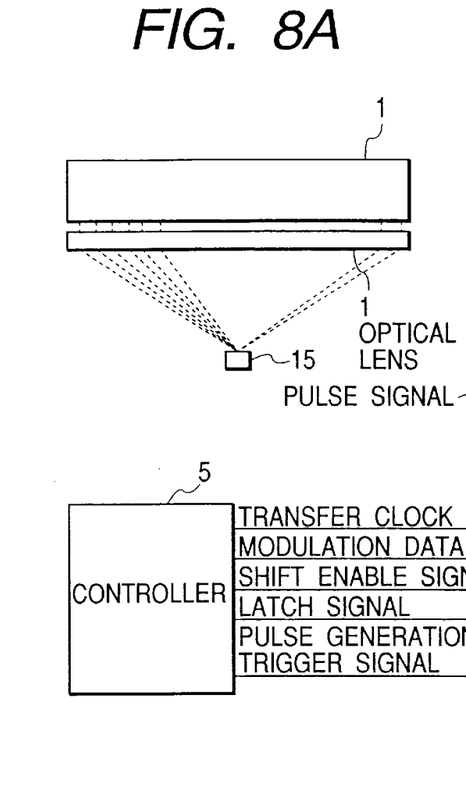
FIGS 8A, 8B and 8C are a front view, a side view and a top view showing an embodiment of the image recording apparatus according to the present invention respectively.
Figure 8B:
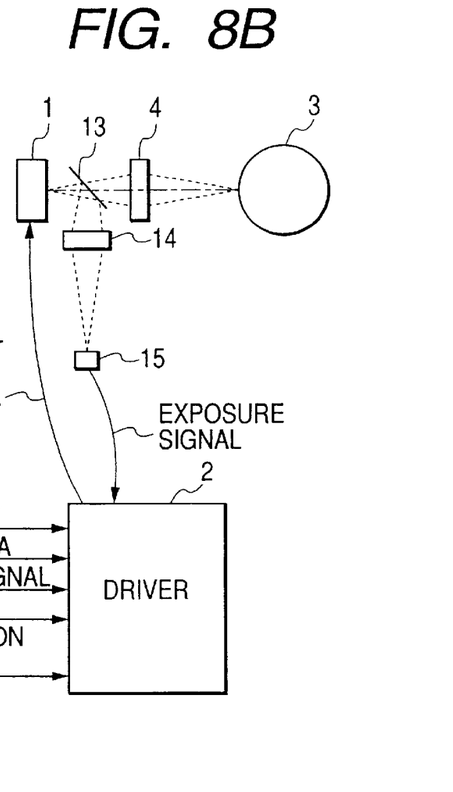
Figure 8C:
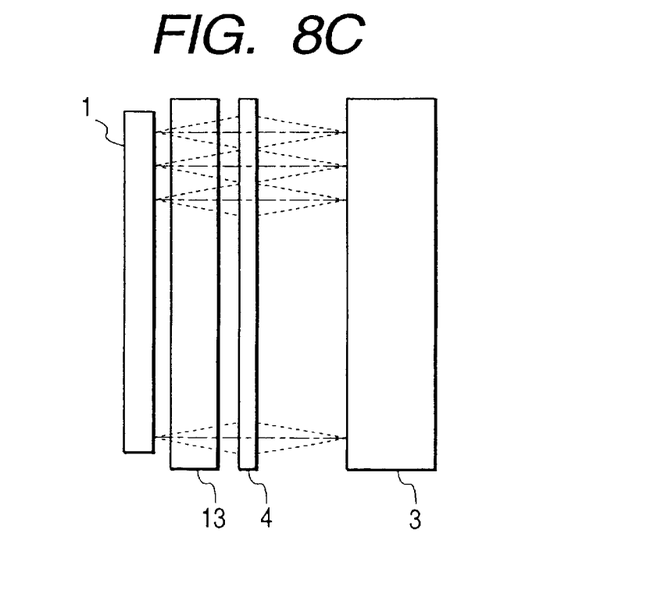

FIGS. 8A, 8B and 8C are a front view, a side view and a top view showing an embodiment of image recording apparatus according to the present invention respectively, in which an embodiment of the pulse generation apparatus according to the present invention is applied to the exposure portion.

In FIGS. 8A, 8B and 8C, an exposure portion constituting the characteristic portion of an image recording apparatus according to the present invention comprises a light source 1, a driver 2, an optical system 4, an image carrier 3, a controller 5, a half-mirror 13, a focusing lens 14, and a photoelectric conversion unit 15.

In FIGS. 8A, 8B and 8C, the light source 1 is constituted by arranging a multiplicity of light-emitting points across the recording area, and these light-emitting points are pulse-driven by the driver 2 in response with the modulation data. A pulse of light emitted from the light source 1 is guided to the image carrier 3 through the optical system 4, and an image is focused to obtain an exposure image. This exposure image may be either a latent image or a toner image corresponding to the type of the image carrier 3 or the system of the image recording apparatus. Also, a part of beams emitted by the light source 1 is divided by the half-mirror 13, and is guided to the photoelectric conversion unit 15 by the focusing lens 14. The photoelectric conversion unit 15 detects an exposure on the basis of the beams thus incident to output to the driver 2.

The light source 1 is light-emitting element array constituted by arranging a multiplicity of light-emitting points such as LED array and LD array, and is caused to emit light by supplying current pulses or voltage pulses.

The driver 2 is constituted by using one or more LSIs shown in the above-described second embodiment (see FIG. 5), and can drive the light source 1 through cable as shown in FIG. 8. In a case where there are provided a multiplicity of light-emitting elements in the light source, the driver 2 is incorporated in the light source 1, and the light-emitting elements and the driving LSI are connected by wire bonding. The driver 2 also has a pulse width gradation depiction function for expressing the gradation by controlling the light-emitting time, and a pulse width exposure stabilization function for stabilizing the exposure by controlling the light-emitting time.

The controller 5 controls the exposure portion of the image recording apparatus by supplying the transfer clock, the modulation data, the shift enable signal, the latch signal, and the pulse generation trigger signal to the driver 2. Since the operation of each signal has been described with reference to FIGS. 5 and 7, duplicated description will be omitted here.

For the image carrier 3, there is normally used an image carrier whose physical or chemical characteristic changes depending upon light to allow information to be recorded thereon, and for example, an electrophotographic photoreceptor using photoconductivity, a photographic film using oxidation and reduction of silver and the like can be cited.

For the optical system 4, there is normally used SELFOC lens array, and micro lens array can also be used.

There are many types for the half-mirror 13, and a half-mirror comprising metal deposited on a transparent glass plate, whose reflection factor and transmittance are determined by the thickness of the deposited film, is generally used.

The focusing lens 14 is used to cause the principal rays to cross at substantially one point by bending a plurality of beams from the half-mirror 13. Since normally the principal rays of the plurality of beams incident on the focusing lens are substantially in parallel to one another, all the principal rays cross at the focal position of the lens, and when the photoelectric conversion unit 15 is disposed here, the area of the light receiving portion can be made smaller.

For the photoelectric conversion unit 15, a photodiode, a phototransistor, a CCD device and the like are used. Particularly, when the CCD device is used, the sum total of light incident during a certain period of time, that is, the integral amount of light can be detected. In the present embodiment, in order to stabilize the exposure, the pulse width is increased or decreased (details will be described later). After the stabilized exposure, the integral amount of light of the pulse light can be detected, and it can be fed back so as to maintain it constant, and therefore, the precision in the exposure is dramatically improved. In a method for measuring the light-emitting intensity by causing the light-emitting points to continuously emit light as in the related art, it is impossible to detect whether or not the exposure for each of the pulse light is correct although the exposure can be controlled by increasing or decreasing the pulse width. In this respect, in order to detect the integral amount of light, there is also a method for combining an integrating circuit with a photodiode or a phototransistor in addition to the CCD device.

On receipt of this signal of exposure, the driver 2 corrects a look-up table for the pulse width indicating unit 16 incorporated to stabilize the exposure.

The present embodiment is constructed as described above, and the image recording operation and the exposure stabilizing operation will be described hereinafter.

In FIG. 8, the image forming operation is performed when, on reception of image data (not shown), the controller 5 outputs a transfer clock, modulation data, a shift enable signal, a latch signal and a pulse generation trigger signal to drive the driver 2. At this time, in the driver 2, a series of operations shown in the timing chart of FIG. 7 are performed, k pieces of light-emitting elements are caused to emit light by their respective modulation data. The light emitting is simultaneously started by all of k pieces of elements, but the termination is performed at random because the pulse width indicating signal differs for each element.

On the other hand, when the light emitting starts (time g in FIG. 7), in order to transfer data required for the next light emitting, the controller 5 supplies a transfer clock, new modulation data and a shift enable signal again. A new modulation data train is converted into a pulse width indicating signal train, and is set in the shift register 18 for pulse width data. At a time, at which setting of a new pulse width indicating signal train to the shift register 18 for pulse width data is finished, the light emitting of the light-emitting elements, which was performed in parallel, has been finished (designed so as to finish). Therefore, the driver 2 outputs a latch signal and a pulse generation trigger signal to start light emitting based on new data. This procedure is repeated to record an image.

The exposure stabilizing operation according to the embodiment shown in FIG. 8 will be described. The controller 5 operates the photoelectric conversion unit 15 to detect the integral amount of light, and in parallel thereto, a pseudo modulation data train, which is irrelevant to the image data, is supplied to the driver 2 together with a transfer clock, a shift enable signal, a latch signal and a pulse generation trigger signal. The pseudo modulation data train is created such that only any one of k pieces of light-emitting elements existing once emits light at a predetermined pulse width.

Figure 9:
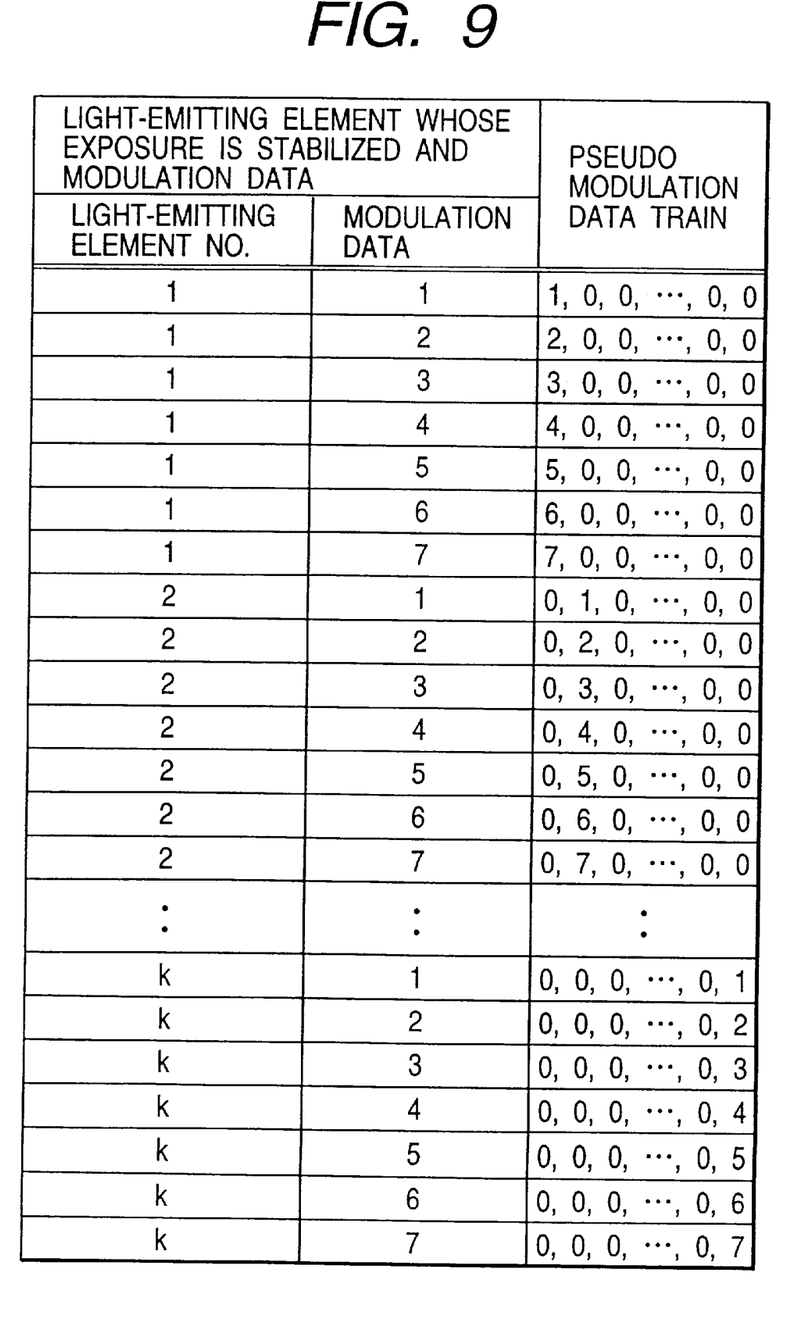
FIG. 9 is a view showing an example of pseudo modulation data trains.

FIG. 9 is a view showing an example of the pseudo modulation data train when the pulse width indicating unit is constituted by the look-up table shown in FIG. 6.

For example, in the case of stabilizing the exposure by pulse light outputted when a light-emitting element 1 has modulation data=1, the light-emitting element 1 is supplied to the driver 2 together with a transfer clock, a shift enable signal, a latch signal and a pulse generation trigger signal using a pseudo modulation data train "1, 0, 0, . . . , 0, 0" to cause the light-emitting element 1 to pulse-emit light, and the integral amount of light is detected by the photoelectric conversion unit 15, which has been brought into an operating state in advance. This integral amount of light corresponds to the light-emitting efficiency of the light-emitting element 1, and a value 20 outputted when the light-emitting element address signal=1 and the modulation data=1 on the look-up table of FIG. 6 is corrected in such a manner that this integral amount of light is equal to the reference value.

Next, when the light-emitting element 1 has modulation data=2, a value 40 outputted when the light-emitting element address signal=1 and the modulation data=2 on the look-up table of FIG. 6 is corrected using a pseudo modulation data train "2, 0, 0, . . . , 0, 0". This procedure is repeated in a similar way hereinafter until the modulation data=7 at a light-emitting element k to terminate a series of the exposure stabilizing operation.

This exposure stabilizing operation enables, in an image recording apparatus according to the present embodiment, an image to be always recorded at an uniform exposure for all the light-emitting points.

More specifically, within the driver 2 according to the present embodiment, there is to be provided a pulse width indicating portion for generating a pulse width indicating signal for each pulse width control circuit (see FIG. 5) corresponding to each light-emitting element to distribute to each pulse width control portion on the basis of modulation data carrying image information and the light-emitting efficiency for each of a plurality of light-emitting elements constituting the light source.

Hereinafter, with reference to the drawings, the description will be made of a fourth embodiment according to the present invention.

Figure 10:
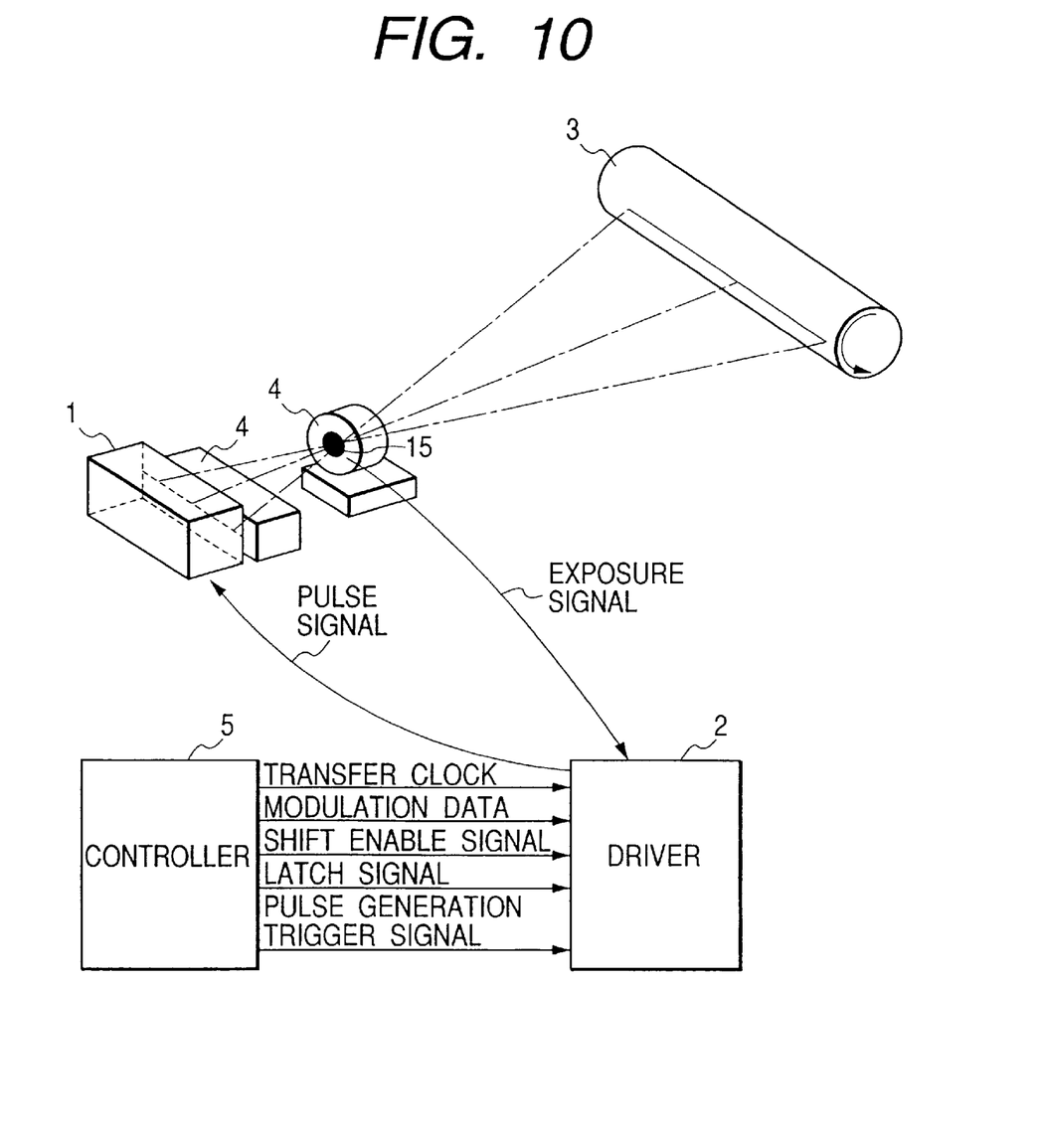
FIG. 10 is a perspective view showing another embodiment of the image recording apparatus according to the present invention.

FIG. 10 is a perspective view showing another embodiment of image recording apparatus according to the present invention.

In FIG. 10, the exposure portion, by which an image recording apparatus according to the present invention is characterized, comprises a light source 1, a driver 2, an optical system 4, an image carrier 3, a controller 5, and a photoelectric conversion unit 15. In FIG. 10, the light source 1 is constituted by arranging a multiplicity of light-emitting points, and these light-emitting points are pulse-driven by the driver 2 in response to the modulation data. A pulse of light emitted from the light source 1 is guided to the image carrier 3 by the optical system 4, and an image is focused to create an exposure image on the image carrier 3. Also, the structure, the operation, the timing, and the like of the driver 2 are the same as in the third embodiment (see FIG. 8), and duplicated description will be omitted.

In FIG. 10, for the light source 1, LED array is generally used, and it may be possible to adopt plane light-emitting laser diode array, for which the compatibility between higher image quality and higher speed is required, and in which the beams can be made smaller on the image carrier 4 at low power consumption.

In FIG. 10, the optical system 4 is used to cause all light-emitting points to focus an image onto the image carrier 3, and has magnification from 2× to about 10× in order to make the light source 1 smaller and reduce the cost.

In FIG. 10, the photoelectric conversion unit 15 is placed at a position where a plurality of optical paths of laser beams converge on so as to allow a plurality of beams from the light source 1 to be detected, and is normally incorporated in a suitable position in the optical system 4. This is to shield the central portion of the beams, but if its diameter is made sufficiently small relative to the lens diameter, the characteristic of the beams guided to the image carrier 3 will not be much affected. For the photoelectric conversion unit 15, a photodiode, a phototransistor, a CCD device or the like is used as in the case of the third embodiment (see FIG. 8), and only the sensor portion is incorporated in the optical system 4, and the electric circuit attached is arranged in the outside of the lens.

As described above, according to the present invention, the control step of the pulse width can be further divided without increasing the operating frequency of the counter.

Thus, while there have conventionally been about 16 control steps in the pulse control, it is possible to easily increase them to 256 to about 1024, and to implement both minute gradation depiction and stabilized exposure by a combination of the increase in the control steps with gradation control using the pulse number according to the present invention.

According to, for example, the conventional gradation depiction method and exposure stabilization method, only gradation of a gradation depiction number of 2×16×4=128 could be implemented by setting gradation using pulse number control to two steps, gradation using pulse width control to 16 steps and the size of a half-tone cell to four dots, and moreover the stabilized exposure was compelled to be very roughly executed in 16 steps of pulse light-emitting intensity. According to the present invention, however, gradation using pulse width control can be made into 32 steps in addition to the stabilized exposure, and therefore, 2×32×4=256 gradation can be expressed with the size of the half-tone cell as four dots.

Further, according to the present invention, since the pulse light-emitting intensity is not adopted as a control factor unlike the related art, the driving LSI needs no analog circuit, but can be constituted only by a digital circuit. Therefore, the circuit area and the power consumption are reduced by a large amount as compared with the conventional methods, and a decrease in cost due to the miniaturized driving LSI and the miniaturized power source can also be expected. Moreover, the digital circuit is very high in circuit precision, and is able to ensure high precision particularly in respects of temperature stability and changes with time. Also, design of LSI, debug, performance evaluation as well as delivery inspection during manufacture and the like can be easily performed in a short time, and therefore, greatly contributes to shortened delivery in new product development and reduced cost of manufacture.

Particularly, in the fourth embodiment (see FIG. 10), the light source size is reduced to one half to one tenth (inverse of magnification of the optical system) of that in the third embodiment (see FIG. 8), and therefore, the circuit area and the power consumption are also proportionate to make it possible to implement the miniaturization and lower power consumption. Thus, the present invention brings about a noticeable effect.

What is claimed is:

1. A pulse generation apparatus, comprising:
 a polyphase clock generating unit that generates polyphase clocks having an equal frequency and different phases on the basis of a predetermined reference clock;
 a clock selecting unit that selects one clock from among polyphase clocks outputted from said polyphase clock generating unit on the basis of a predetermined pulse width indicating signal for indicating a pulse width;
 a counting unit that counts clocks selected by said clock selecting unit to output a pulse end signal at timing at which a counted value determined on the basis of said pulse width indicating signal is reached;
 a pulse output unit that starts generation of a pulse signal on the basis of a pulse generation trigger signal for instructing to start the generation of a pulse to terminate said generation of the pulse signal on the basis of the pulse end signal outputted from said counting unit; and
 a delay unit that generates a count starting signal for instructing to start the counting of clocks in said counting unit by delaying said pulse generation trigger signal by an amount of delay selected on the basis of said pulse width indicating signal.

2. The pulse generation apparatus according to claim 1, wherein said clock selecting unit selects one clock from among said polyphase clocks on the basis of said pulse width indicating signal at timing at which said pulse generation trigger signal has been inputted, and said delay unit delays said pulse generation trigger signal by an amount of delay corresponding to a clock which has been selected by said clock selecting unit, selected on the basis of said pulse width indicating signal to generate said count starting signal.

3. The pulse generation apparatus, according to claim 1, wherein said delay unit delays said pulse generation trigger signal by an amount of delay selected from among a plurality of amounts of delay, which vary stepwise, on the basis of said pulse width indicating signal, and said delay unit has a number of steps in the amount of delay, which is smaller than a number of clocks having different phases constituting polyphase clocks outputted from said polyphase clock generating unit.

4. The pulse generation apparatus according to claim 1, wherein said pulse width indicating signal is a signal of bit width consisting of a plurality of bits, said counting unit determines said counted value on the basis of a high-order side bit portion among said pulse width indicating signals, and said clock selecting unit and said delay unit select clocks and amounts of delay on the basis of a low-order side bit portion among said pulse width indicating signals respectively.

5. The pulse generation apparatus according to claim 1, wherein said polyphase clock generating unit comprises a plurality of pulse width control portions, each having said clock selecting unit, said counting unit, said pulse output unit and said delay unit, and generates polyphase clocks which are shared by the plurality of pulse width control portions.

6. An image recording apparatus, having light-emitting element array having a plurality of light-emitting elements arranged, and a light-emitting control portion for controlling light emitting by a plurality of light-emitting elements which constitute said light-emitting element array in response to image information, for recording an image consisting of a latent image or a toner image on a predetermined image recording medium by means of light emitting by a plurality of light-emitting elements which constitute said light-emitting element array, said light-emitting control portion comprising:
 a light-emitting pulse width control portion provided correspondingly to each of the plurality of light-emitting elements which constitute said light-emitting element array, that controls the light-emitting pulse widths of the corresponding light-emitting elements; and a polyphase clock generating portion that generates polyphase clocks having an equal frequency and different phases which are shared by a plurality of light-emitting pulse width control portions on the basis of a predetermined reference clock, each of said light-emitting pulse width control portions comprising:

a clock selecting unit that selects one clock from among polyphase clocks outputted from said polyphase clock generating portion on the basis of a predetermined pulse width indicating signal for indicating the pulse width;

a counting unit that counts clocks selected by said clock selecting unit to output a pulse end signal at timing at which a counted value determined on the basis of said pulse width indicating signal is reached;

a pulse output unit that starts generation of a pulse signal on the basis of a pulse generation trigger signal for instructing to start the generation of a pulse to terminate the generation of the pulse signal on the basis of a pulse end signal outputted from said counting unit; and a delay unit that delays said pulse generation trigger signal by an amount of delay selected on the basis of said pulse width indicating signal to thereby generate a count starting signal for instructing to start the counting of clocks in said counting unit.

7. The image recording apparatus according to claim 6, further comprising a pulse width indicating portion that generates a pulse width indicating signal for each light-emitting pulse width control portion corresponding to each light-emitting element to distribute it to each light-emitting pulse width control portion on the basis of modulation data carrying image information and a light-emitting efficiency for each of a plurality of light-emitting elements constituting said light-emitting element array.

* * * * *